(12) United States Patent
Vandanapu (10) Patent No.: US 8,176,114 B2
(45) Date of Patent: May 8, 2012

(54) DISTRIBUTED CROSS-APPLICATION SERVER DEPLOYMENT

(75) Inventor: Eswar Vandanapu, Fremont, CA (US)

(73) Assignee: Oracle International Corporation, Redwood Shores, CA (US)

(*) Notice: Subject to any disclaimer, the term of this patent is extended or adjusted under 35 U.S.C. 154(b) by 229 days.

(21) Appl. No.: 12/039,290

(22) Filed: Feb. 28, 2008

(65) Prior Publication Data

US 2009/0222504 A1 Sep. 3, 2009

(51) Int. Cl.
*G06F 15/16* (2006.01)

(52) U.S. Cl. ......................................................... 709/201

(58) Field of Classification Search .................... 709/201
See application file for complete search history.

(56) References Cited

U.S. PATENT DOCUMENTS

| | | | |
|---|---|---|---|
| 6,633,898 B1* | 10/2003 | Seguchi et al. | 709/201 |
| 6,721,777 B1* | 4/2004 | Sharma | 718/101 |
| 6,748,436 B1* | 6/2004 | Anand et al. | 709/226 |
| 6,892,382 B1* | 5/2005 | Hapner et al. | 717/174 |
| 7,072,822 B2* | 7/2006 | Humenansky et al. | 703/22 |
| 7,162,509 B2* | 1/2007 | Brown et al. | 709/201 |
| 7,447,731 B2* | 11/2008 | Calo et al. | 709/201 |
| 7,475,388 B2* | 1/2009 | Fong et al. | 717/130 |
| 7,802,258 B2* | 9/2010 | Daniel et al. | 718/105 |
| 2003/0037311 A1* | 2/2003 | Busfield | 717/115 |
| 2003/0084056 A1* | 5/2003 | DeAnna et al. | 707/100 |
| 2003/0154239 A1* | 8/2003 | Davis et al. | 709/201 |
| 2004/0064349 A1* | 4/2004 | Humenansky et al. | 705/7 |
| 2004/0177352 A1* | 9/2004 | Narayanaswamy et al. | 717/169 |
| 2004/0255291 A1* | 12/2004 | Sierer et al. | 717/174 |
| 2005/0044531 A1* | 2/2005 | Chawla et al. | 717/122 |
| 2005/0160104 A1* | 7/2005 | Meera et al. | 707/100 |
| 2005/0267856 A1* | 12/2005 | Woollen | 707/1 |
| 2006/0106842 A1* | 5/2006 | Diament et al. | 707/101 |
| 2007/0233881 A1* | 10/2007 | Nochta et al. | 709/228 |
| 2008/0071883 A1* | 3/2008 | Alterman | 709/217 |
| 2008/0098099 A1* | 4/2008 | Khasnis et al. | 709/222 |
| 2008/0294777 A1* | 11/2008 | Karve et al. | 709/226 |
| 2009/0049438 A1* | 2/2009 | Draper et al. | 717/168 |
| 2009/0089407 A1* | 4/2009 | Chalupa et al. | 709/220 |
| 2009/0113327 A1* | 4/2009 | Pogrebinsky et al. | 715/765 |
| 2009/0187822 A1* | 7/2009 | Abreu et al. | 715/700 |
| 2009/0276771 A1* | 11/2009 | Nickolov et al. | 717/177 |

* cited by examiner

*Primary Examiner* — John Follansbee
*Assistant Examiner* — Imad Hussain
(74) *Attorney, Agent, or Firm* — Kilpatrick Townsend & Stockton LLP (57) ABSTRACT

A method for a distributed deployment includes selecting a first feature module of an application to be deployed where the application includes multiple feature modules. A second feature module of an application to be deployed is selected. A first server and a second server to which to deploy the first selected feature module and the second selected feature module, respectively, are selected. A first archive file and a second archive file for the first selected feature module and the second selected feature module, respectively, are generated using deployment information, a deployment template for the application, and at least one feature module file. The first archive file contains a feature module not contained in the second archive file.

9 Claims, 7 Drawing Sheets

*- Prior Art -*

FIG. 1

*- Prior Art -*

| Features | Node 1 | Node 2 | Node 3 |
|---|---|---|---|
| Feature 1<br>├─ Sub-Feature A<br>│  ├─ Sub-Sub-Feature B<br>│  ├─ Sub-Sub-Feature C<br>⋮<br>├─ Business Logic<br>├─ Static Content<br>├─ Metadata<br>└─ User Interface | ✓<br>✓<br><br>✓<br><br><br>✓ | ✓<br>✓<br><br><br><br>✓<br>✓<br>✓ | |
| Feature 2<br>⋮ | ✓ | | ✓ |
| Feature 3<br>⋮ | | ✓ | ✓ |
| Feature 4<br>⋮ | ✓ | ✓ | ✓ |

FIG. 6

| Features | Cluster 1 | Cluster 2 | Cluster 3 |
|---|---|---|---|
| Feature 1<br>├─ Sub-Feature A<br>│  ├─ Sub-Sub-Feature B<br>│  ├─ Sub-Sub-Feature C<br>⋮<br>├─ Business Logic<br>├─ Static Content<br>├─ Metadata<br>└─ User Interface | ✓<br>✓<br><br>✓<br><br><br>✓ | ✓<br>✓<br><br><br><br>✓<br>✓<br>✓ | |
| Feature 2<br>⋮ | ✓ | | ✓ |
| Feature 3<br>⋮ | | ✓ | ✓ |
| Feature 4<br>⋮ | ✓ | ✓ | ✓ |

FIG. 7

Feature module root
- Configuration
- Templates
    - Deployment Descriptors
    - Deployment Units
    - Other
- Features
    - Platform
    - Password Validation
        - Feature.xml
        - Lib
            - Password-service.jar
        - Client-Lib
            - Password-Client.jar
        - Metadata
            - Password-policy-entity-def.xml
            - Password-history-entity.xml
            - Event-handlers.xml
            - …
        - Schema
            - Plug-in
            - Metadata
            - RDBMS
    - Provisioning Policies
    - User Management
    - Object Management
- Setup
    - DeploymentMap.xml
    - [DeploymentTarget1] (ex. FrontCluster)
        - profile.xml (TBD if properties is enough)
        - WORK
        - FINAL
    - [DeploymentTarget2] (ex. SchedulerCluster)
    - Setup Utilities (May be part of ASCTL ) (Perform the install and patch functions)
- Log
- Doc

DISTRIBUTED CROSS-APPLICATION SERVER DEPLOYMENT

BACKGROUND OF THE INVENTION

The present invention relates generally to deploying applications, and in particular to providing a standardized framework and packaging format for deploying applications to heterogeneous servers.

Presently, many problems are met when deploying features to servers such as web servers, servlet containers, application servers, and Enterprise Services Buses (ESB). One such problem is the inability to provide for deployment into any container or server while making contextual changes. Servers frequently require deployments containing updates, upgrades, patches, functionality enhancements, and so on. Each server may be customized differently from other servers, thereby requiring a customized deployment. Each server may also require a unique deployment to implement specific functions. The dissimilar requirements of each server strains developers since they must focus on supporting multiple servers with customized deployment solutions. Further, developers are forced to develop deployments for many different types of servers which may require specific deployment packages with unique file formats, file structures, languages, and so on. Developers' resources are consumed as they try to develop deployments with these diverse requirements while customers' costs are increased since they must seek additional consulting for their customization issues. Moreover, the developers' efforts in supporting different servers and needs divert their focus from improving the quality of a deployment's contents.

Further, these limitations cause some developers to avoid supporting multiple server types altogether. Instead, these developers hope to concentrate on the features of a deployment directed to only one or a small set of server types. In so doing, developers forfeit support and deployment availability for many other potential server types.

Figure 1:
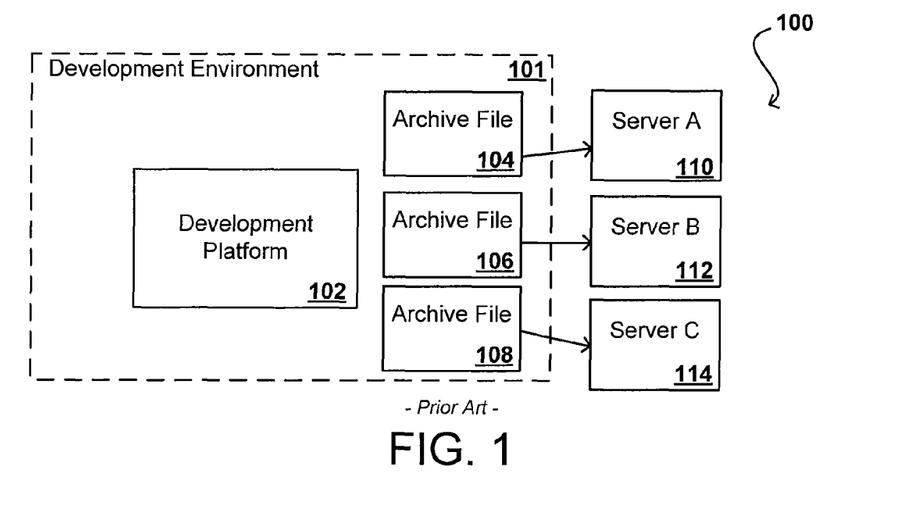
FIGS. 1-3 illustrate deployment approaches of the prior art.

FIG. 1 illustrates a deployment approach of the prior art. In the deployment approach 100, a development environment 101 includes a development platform 102 and archive files 104, 106, and 108. Each of the archive files 104, 106, and 108 include a deployment and are separately developed for each of the servers 110, 112, and 114. In other words, archive file 104 is developed specifically for server 110 and cannot be used for deployment to either server 112 or 114. One problem with this approach is that separately developing deployment files for each and every server is costly and error-prone. Also, disconnected deployments further complicate future support and patches to these servers.

Figure 2:
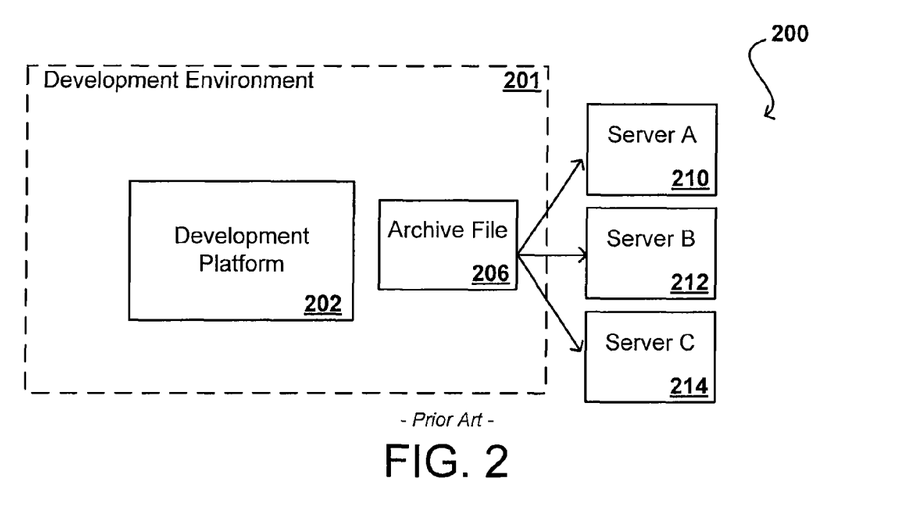

FIG. 2 illustrates another deployment approach of the prior art. In the deployment approach 200, a development environment 201 includes a development platform 202 and a single archive file 206. The archive file 206 includes a deployment and is developed for all of the servers 210, 212, and 214. In other words, archive file 206 is not developed specifically for any one server and can be used for deployment to servers 210, 212, and 214. Servers 210, 212, and 214 may each require at least some differing or mutually exclusive features. For deployment to server 210, the archive file 206 contains unnecessary, unneeded, and/or unwanted features since it contains other features directed only to servers 212 and 214. Similarly, for deployment to server 212, the archive file 206 contains excessive features inappropriate for servers 210 and 214. In addition, the archive file 206 contains features that are improper for server 210, 212, and 214 since it may contain features only for other customers' servers (not shown) as well. Drawbacks with this approach are that the deployment cannot be customized for individual servers, packages are excessively large, and some unneeded or unwanted features may be inadvertently deployed to a server.

Figure 3:
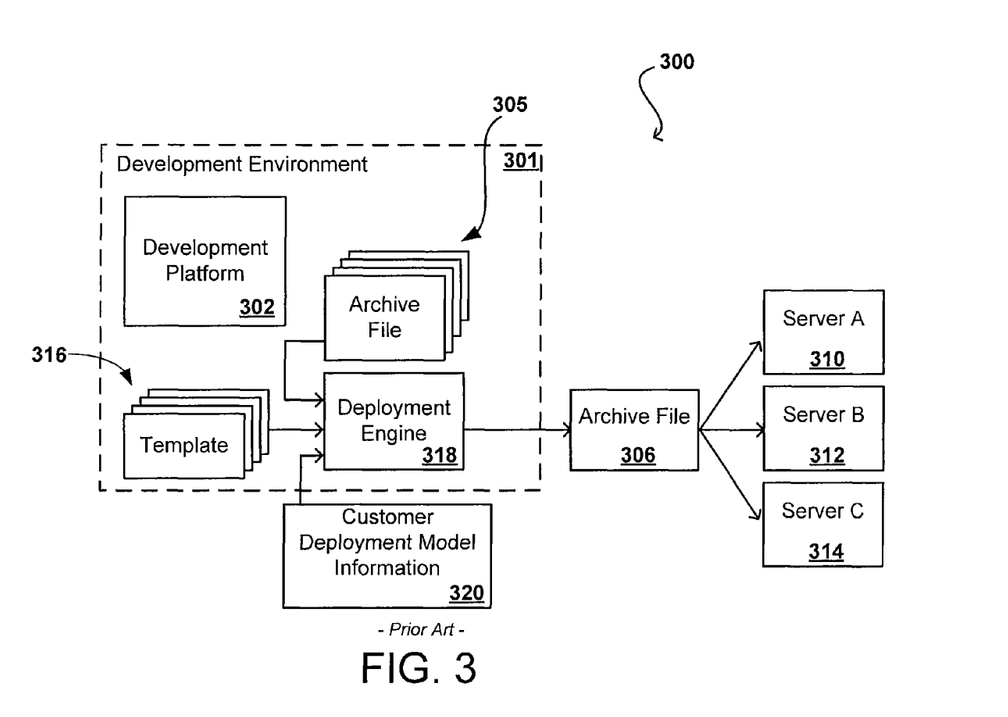

FIG. 3 illustrates yet another deployment approach of the prior art. In the deployment approach 300, a development environment 301 includes a development platform 302, a set of archive files 305, templates 316, and a deployment engine 318. Customer deployment model information 320 includes information regarding the deployment to servers 310, 312, and 314. The deployment engine 318 generates archive file 306 based on the set of archive files 305, the templates 316, and customer deployment model information 320. This approach offers an advantage over previous approaches since it allows dynamic development of a customized archive file. This archive file can contain a custom deployment to a single customer with only the features necessary for servers 310, 312, and 314. Unfortunately, one disadvantage with this approach is that the archive file is not separated into independent parts for deployment to different servers, and thus must contain all features for all deployments. For example, the archive file may contain features for server 310 that are improper for server 312.

An application may be deployed in a multiple cluster topology, where more than one node exists. Also, an application may be deployed in a distributed topology, where the application is split and deployed to multiple targets. Clustered and distributed topologies are not mutually exclusive, and in a distributed topology any given target can be a single node or a cluster. For applications deployed in such topologies, current solutions are not capable of dynamically dividing a deployment based on specific features required by servers and generating separate archive files containing only the features necessary for their target servers. In addition, current solutions do not offer the ability to easily perform a distributed deployment where customers have the ability to easily select which features will be deployed to which servers.

Also, current deployment solutions fail to support deployment to heterogeneous servers. A deployment that can be deployed to one type of server must be rewritten for every other type of server to which the deployment may need to be deployed. This impediment is compounded by the limitless configurations each server may have.

Developers and customers are increasingly seeking solutions that are more cost-effective, customizable, maintainable, and robust while applications and their deployments continue to become more complicated. Currently, a deployment needs to be developed specifically for each server and each possible deployment scenario. With infinite possibilities of how customers can choose to deploy, support is only possible via consulting, which increases customers' cost.

Therefore, an improved deployment approach is desirable, including the ability for deploying deployments to heterogeneous servers, servers in multiple cluster and distributed mode topologies, and/or servers in multiple deployment environments. The approach would preferably reduce cost by reducing customizations and be capable of supporting multiple variations in deployment choices easily and consistently. The approach would also make delivery of support easier for additional servers.

BRIEF SUMMARY OF THE INVENTION

Systems and methods in accordance with various embodiments of the present invention can overcome these and other deficiencies in existing deployment approaches.

In various embodiments, a method for a distributed deployment includes selecting a first feature module of an application to be deployed where the application includes multiple feature modules. A second feature module of an application to be deployed is selected. A first server and a second server to which to deploy the first selected feature module and the second selected feature module, respectively, are selected. A first archive file and a second archive file for the first selected feature module and the second selected feature module, respectively, are generated using deployment information, a deployment template for the application, and at least one feature module file. The first archive file contains a feature module not contained in the second archive file.

The method may include providing the first and second archive file to the first and second server, respectively, and deploying the first and second selected feature module to the first and second server, respectively. Selecting a feature module may include selecting additional feature modules of the application to be deployed. The second server may utilize deployment information different from the first server. The first server and second server may be heterogeneous. The method may include deploying multiple archive files to multiple servers and generating a deployment map to track the location of feature modules across the multiple servers. At least one of the archive files may be one of an enterprise archive (EAR) file, Java archive (JAR) file, web application archive (WAR) file, or ZIP file.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which.

DETAILED DESCRIPTION OF THE INVENTION

Systems and methods in accordance with various embodiments overcome the aforementioned and other deficiencies in existing deployment approaches.

Figure 4:
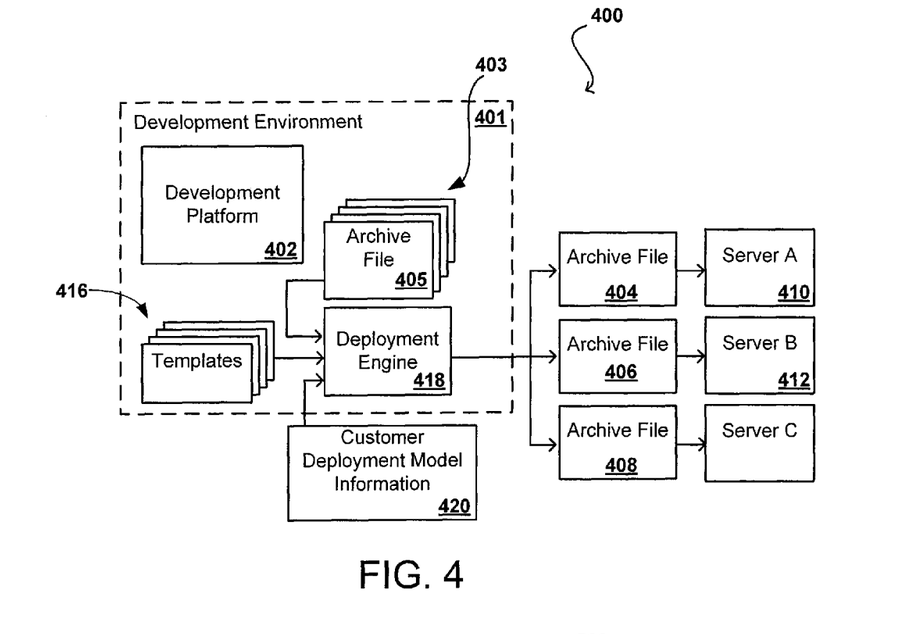
FIG. 4 illustrates a deployment approach that can be used in accordance with one embodiment.

For example, FIG. 4 illustrates an exemplary deployment approach 400 that can be used in accordance with one embodiment of the present invention. In the deployment approach 400, a development environment 401 includes a development platform 402, a set of archive files 403, templates 416, and a deployment engine 418.

An archive file 405 in the set of archive files 403 may be an enterprise archive (EAR) file, a Java archive (JAR) file, a web application archive (WAR) file, a ZIP file, or the like. The archive file 405 contains at least one feature module that can be deployed to a server. For purposes of explanation, embodiments of the present invention will be described with reference to servers, but it will be understood that embodiments of the present invention may be used in conjunction with any other location that may receive a deployment. A feature module may contain, but is not limited to containing, updates, patches, and/or functionality additions. For example, a feature module may contain metadata definitions for deploying the standard metadata required to use existing application components, Java libraries that add new plug-ins, metadata, plug-in definitions, logical choice information indicating which service should execute in which node, and/or Business Process Execution Language (BPEL) process definitions. The plug-ins may be, but are not limited to being, password validators, agents, and/or event handlers. A feature module within archive file 405 may contain multiple sub-features such as user interface, business logic, static content, and/or metadata features. Each sub-feature may contain its own sub-sub-features, and so on. The aforementioned description will apply to any archive file discussed hereinafter.

Use of these archive files streamlines development of deployments and enhances modularity in developing functionality. This improvement in turn reduces the possibility of breaking bugs or implementing enhancements incorrectly. Also, these archive files increase the maintainability of applications since customizations and functionality can be kept in different structures, allowing the functionality to be modified or fixed without breaking application customizations.

The templates 416 may provide base information to be used with place holders to determine where business logic and other information from features will be deployed. Separating templates in this manner allows customers to modify the base template to meet their needs, if required.

The customer deployment model information 420 includes information regarding the deployment for applications installed fully on a single server or for applications installed, for example, in a multiple cluster or distributed mode topology. The customer deployment model information 420 may include a customer profile, which may in turn include one or more profiles providing information about target servers. The customer deployment model information 420 may also include a deployment map (which includes a mapping of which components are to be deployed to which servers), a target server's connection information, a target server's type, a target server's location, a target server's application version, and so on.

In a multiple cluster or distributed mode topology, the customer deployment model information 420 may contain information regarding which feature module and/or sub-features are to be deployed to which servers.

The deployment engine 418 dynamically generates multiple archive files 404, 406, and 408 based on the set of archive files 403, the templates 416, and customer deployment model information 420. Taken collectively, the generated archive files 404, 406, and 408 make up the entire deployment. However, each archive file is generated for a specific server and contains only those portions of the deployment that are necessary for each archive file's target server. For example, archive file 404 contains only business logic of a specific feature for server A 410, while archive file 406 contains only static content of a specific feature for server B 412. In this manner, features of a deployment can be deployed separately and at different times. Also, the deployment features can be spread across the servers based on current server loads to optimize bandwidth and speed. Further, this allows the deployment time per server to be minimized.

Figure 5:
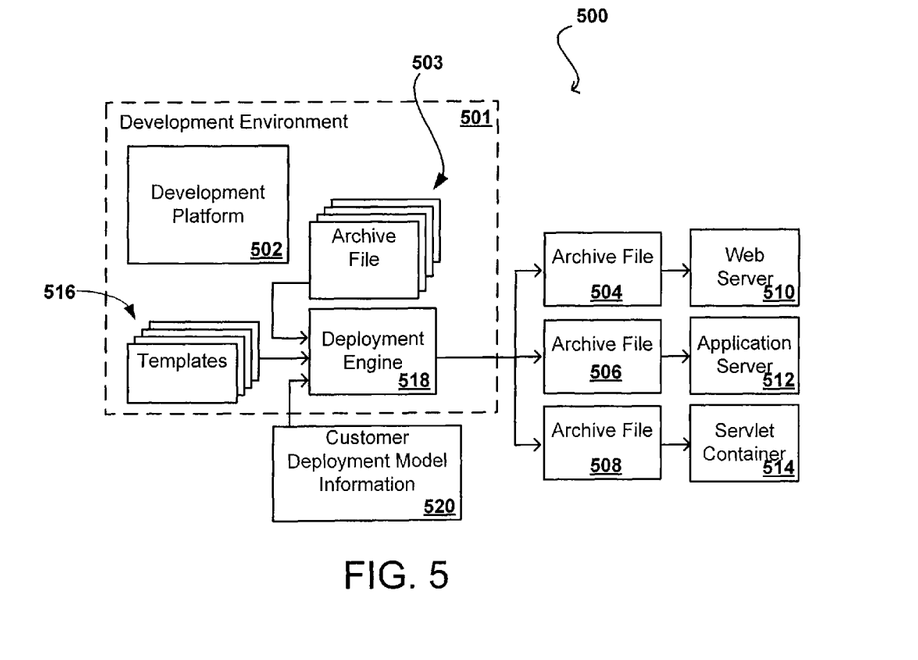
FIG. 5 illustrates a deployment approach that can be used in accordance with one embodiment.

FIG. 5 illustrates another exemplary deployment approach 500 that can be used in accordance with one embodiment of the present invention. In the deployment approach 500, a development environment 501 includes a development platform 502, a set of archive files 503, templates 516, and a deployment engine 518.

The templates 516 may provide base information to be used with place holders to determine where business logic and other information from features will be deployed. Separating templates in this manner allows customers to modify the base template to meet their needs, if required.

The customer deployment model information 520 includes information regarding the deployment for applications installed in a multiple cluster or distributed mode topology. The customer deployment model information 520 may include a customer profile, which may in turn include one or more profiles providing information about target servers. The customer deployment model information 520 may also include a deployment map (which includes a mapping of which components are to be deployed to which servers), a target server's connection information, a target server's type, a target server's location, a target server's application version, and so on. Each of the servers can be heterogeneous servers. For example, server 510 is a web server, server 512 is an application server, and server 514 is a servlet container.

In a multiple cluster or distributed mode topology, the customer deployment model information 520 may contain information regarding which feature module and/or sub-features are to be deployed to which servers.

The deployment engine 518 dynamically generates multiple archive files 504, 506, and 508 based on the set of archive files 503, the templates 516, and customer deployment model information 520. The archive files 504, 506, and 508 are generated for servers 510, 512, and 514, respectively. Taken collectively, the generated archive files 504, 506, and 508 make up the entire deployment. However, each archive file is generated for a specific server and contains only those portions of the deployment that are necessary for each archive file's target server. For example, archive file 504 contains only business logic of a specific feature for web server 510, while archive file 506 contains only static content of a specific feature for application server 512.

To generate an archive file, the deployment engine 518 may choose an appropriate file type based on the target server type since the target server may require a certain file type for deployments. Further, the deployment engine may organize the deployment in a specific file structure if required by the target server.

Figure 6:
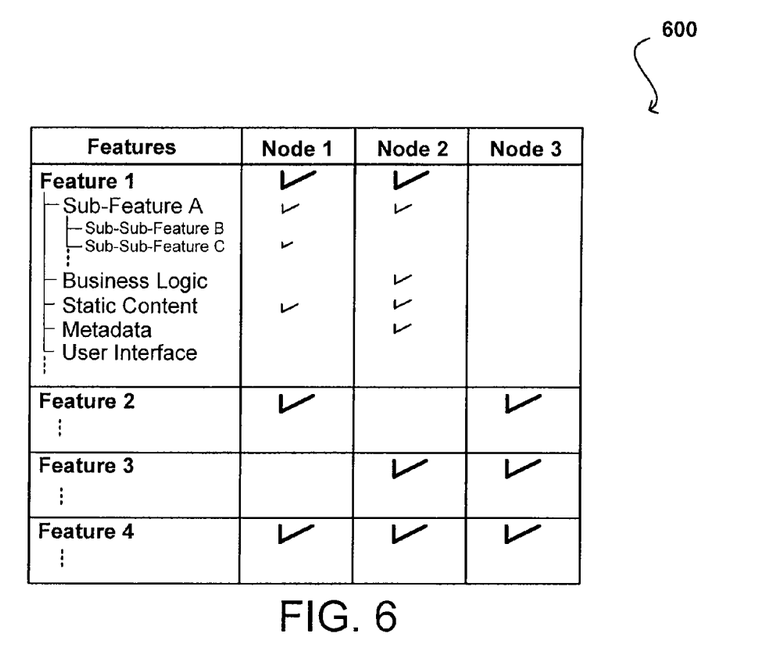
FIG. 6 illustrates a deployment map that can be used in accordance with one embodiment.

FIG. 6 illustrates an exemplary deployment map 600 that can be used in accordance with one embodiment of the present invention. Nodes 1-3 represent servers in a multiple cluster or distributed mode topology. Features 1-4 represent the available features for a deployment. Each node in the topology receives certain features that the node may or may not share in common with other nodes. For example, Nodes 1 and Node 2 are both to receive Feature 1, but only Node 1 is to receive Sub-Sub-Feature C and only Node 2 is to receive the Business Logic sub-feature. Node 3 does not receive any part of Feature 1, but does receive at least some features of Feature 2, while Node 2 does not. Accordingly, an archive file can be generated specifically for Node 1 containing all the check-marked features in the Node 1 column. Such a deployment map allows for more flexibility in managing a deployment across multiple servers. The features of the deployment may be easily divided into parts and distributed to efficiently increase overall server bandwidth and speeds.

Figure 7:
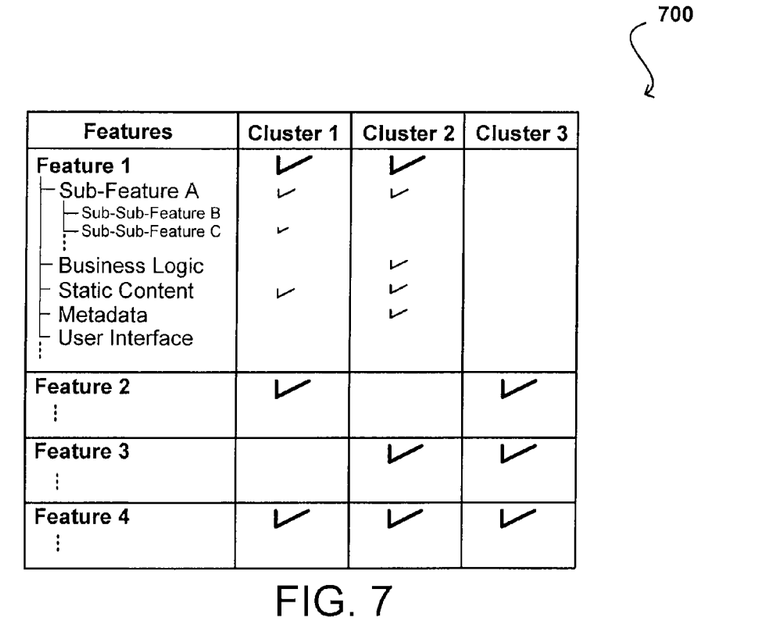
FIG. 7 illustrates a deployment map that can be used in accordance with one embodiment.

FIG. 7 illustrates another exemplary deployment map 700 that can be used in accordance with one embodiment of the present invention. The deployment map 700 is similar to deployment map 600, while the deployment map 700 approaches the deployment planning from a server group/cluster approach. For example, a specific deployment meant for a cluster of servers can be specified to the server cluster, rather than separately to each and every server that is a member of that cluster. In FIG. 7, Clusters 1-3 represent groups of servers in a multiple cluster or distributed mode topology. Features 1-4 represent the available features for a deployment. Each cluster in the topology receives certain features that each cluster may or may not share in common with other clusters. For example, Clusters 1 and Cluster 2 are both to receive Feature 1, but only Cluster 1 is to receive Sub-Sub-Feature C and only Cluster 2 is to receive the Business Logic sub-feature. Cluster 3 does not receive any part of Feature 1, but does receive at least some features of Feature 2, while Cluster 2 does not. Accordingly, an archive file can be generated specifically for Cluster 1 containing all the check-marked features in the Cluster 1 column. Such a deployment map allows more flexibility in managing a deployment across multiple servers. The features of the deployment may be easily divided into parts and distributed to increase overall server bandwidth and speeds.

Deployment maps 600 and 700 may be used in concert in order to benefit from each map's advantages. For example, a deployment map may allow a deployment to be assigned to a group of servers at once, while allowing only one specific server in the cluster to be assigned another feature in addition to the group's deployment. A person of ordinary skill in the art will appreciate other combinations to implement deployment maps and deployment planning in general.

Figure 8:
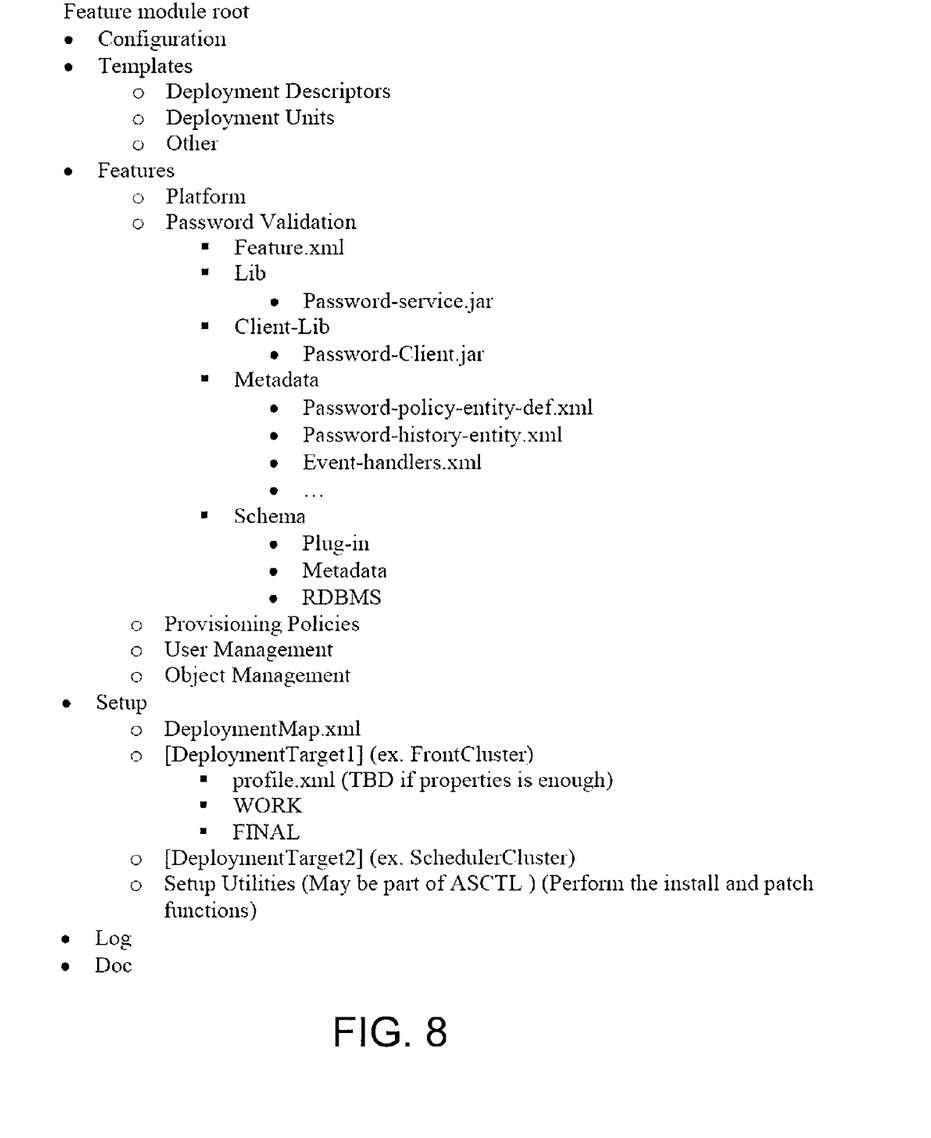
FIG. 8 illustrates an archive file hierarchy that can be used in accordance with one embodiment.

FIG. 8 illustrates an example of an archive file hierarchy that can be used in accordance with one embodiment of the present invention. An archive file for deployment to a server may contain a file/folder hierarchy with multiple levels. In addition to at least one feature folder, the archive file may contain configuration, template, setup, and/or log files/folders. Such a directory structure may be substantially similar for each target server type and deploying feature module.

Figure 9:
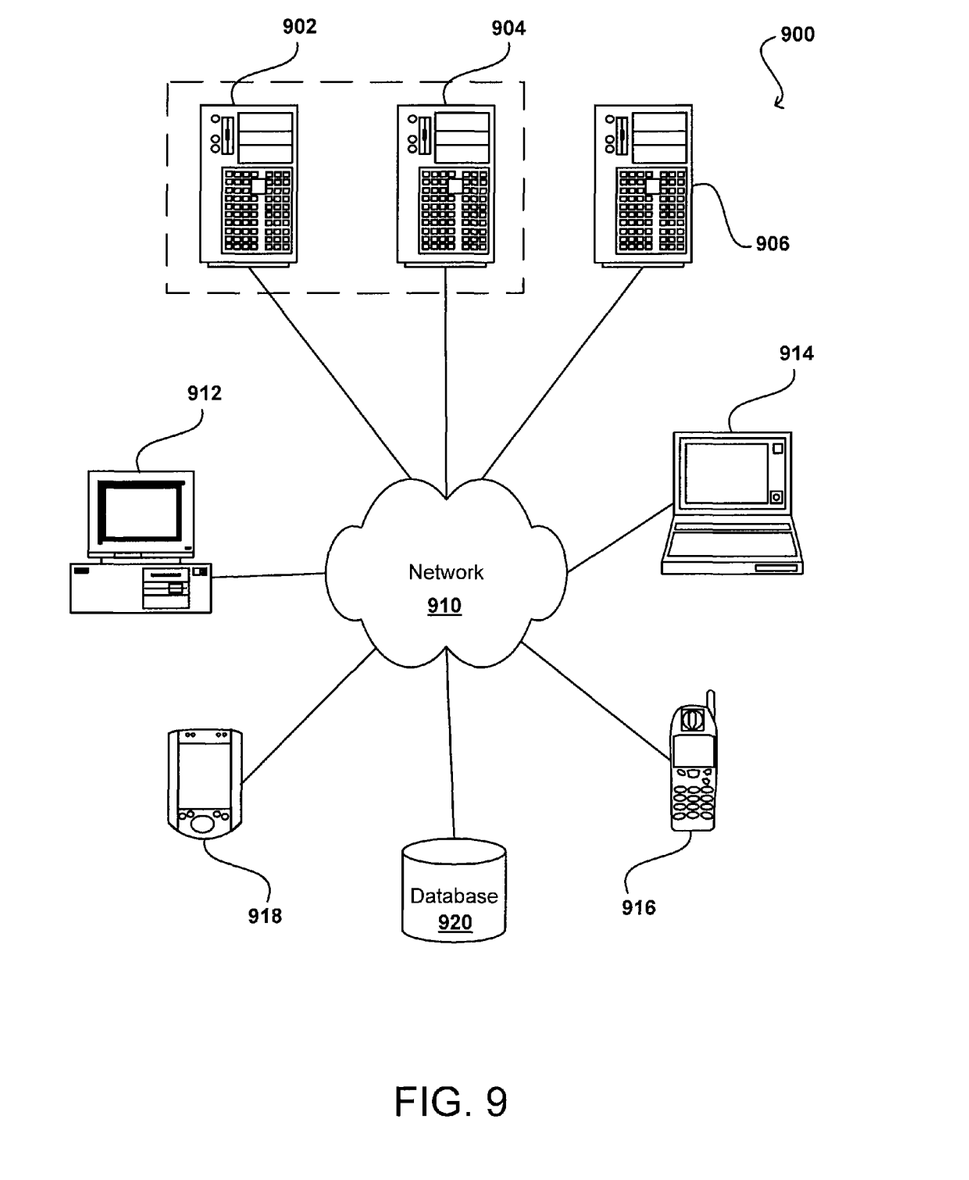
FIG. 9 illustrates components of a computer network that can be used in accordance with one embodiment.

FIG. 9 is a block diagram illustrating components of an exemplary operating environment in which various embodiments of the present invention may be implemented. The system 900 can include one or more user computers, computing devices, or processing devices 912, 914, 916, 918, which can be used to operate a client, such as a dedicated application, web browser, etc. The user computers 912, 914, 916, 918 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 912, 914, 916, 918 may also have any of a variety of applications, including one or more development systems, database client and/or server applications, and Web browser applications. Alternatively, the user computers 912, 914, 916, 918 may be any other electronic device, such as a thin-client computer, Internet-enabled gaming system, and/or personal messaging device, capable of communicating via a network (e.g., the network 910 described below) and/or displaying and navigating Web pages or other types of electronic documents. Although the exemplary system 900 is shown with four user computers, any number of user computers may be supported.

In most embodiments, the system 900 includes some type of network 910. The network may can be any type of network familiar to those skilled in the art that can support data communications using any of a variety of commercially-available protocols, including without limitation TCP/IP, SNA, IPX, AppleTalk, and the like. Merely by way of example, the network 910 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 902, 904, 906 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 906) may be dedicated to running applications, such as a business application, a Web server, application server, etc. Such servers may be used to process requests from user computers 912, 914, 916, 918. The applications can also include any number of applications for controlling access to resources of the servers 902, 904, 906.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 912, 914, 916, 918. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 912, 914, 916, 918.

The system 900 may also include one or more databases 920. The database(s) 920 may reside in a variety of locations. By way of example, a database 920 may reside on a storage medium local to (and/or resident in) one or more of the computers 902, 904, 906, 912, 914, 916, 918. Alternatively, it may be remote from any or all of the computers 902, 904, 906, 912, 914, 916, 918, and/or in communication (e.g., via the network 910) with one or more of these. In a particular set of embodiments, the database 920 may reside in a storage-area network ("SAN") familiar to those skilled in the art. Similarly, any necessary files for performing the functions attributed to the computers 902, 904, 906, 912, 914, 916, 918 may be stored locally on the respective computer and/or remotely, as appropriate. In one set of embodiments, the database 920 may be a relational database, such as Oracle 10g, that is adapted to store, update, and retrieve data in response to SQL-formatted commands.

Figure 10:
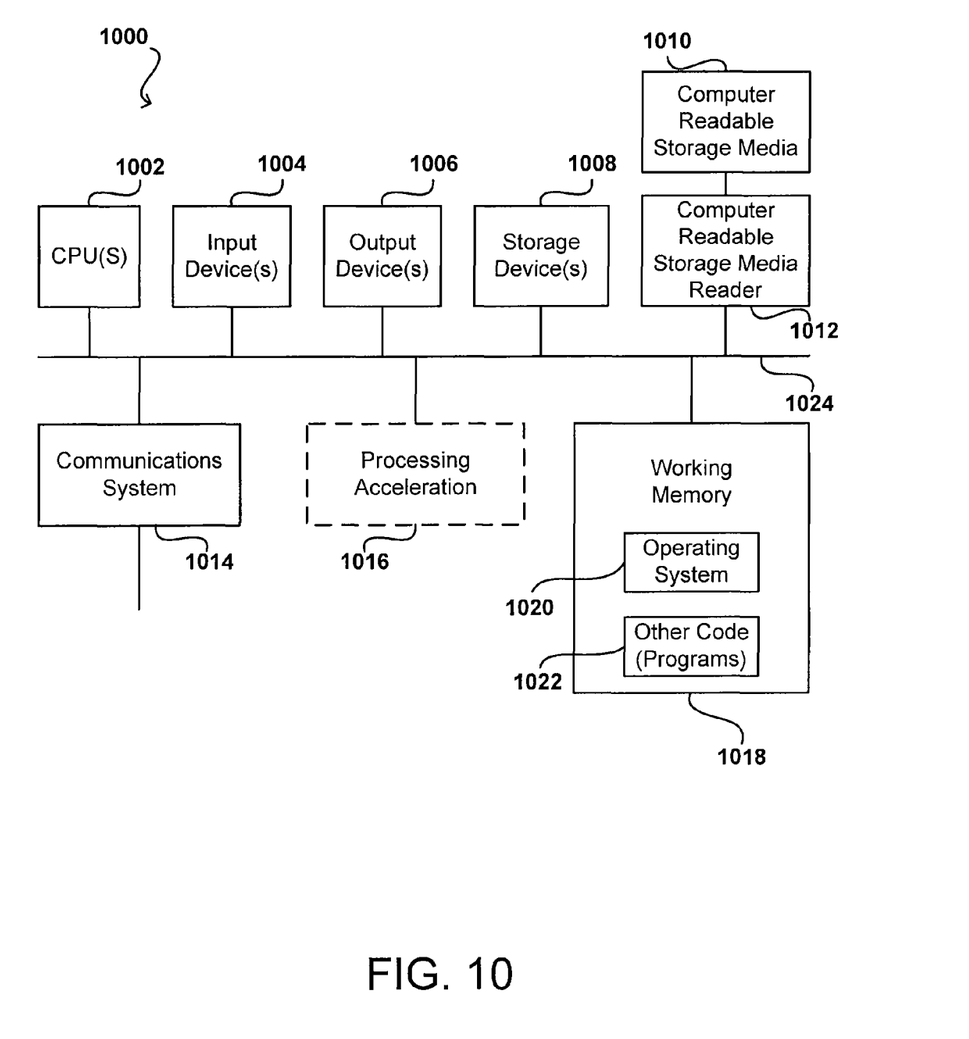
FIG. 10 illustrates components of a computerized device that can be used in accordance with one embodiment.

FIG. 10 illustrates an exemplary computer system 1000, in which various embodiments of the present invention may be implemented. The system 1000 may be used to implement any of the computer systems described above. The computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). The computer system 1000 may also include one or more storage devices 1008. By way of example, the storage device(s) 1008 can include devices such as disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1012, a communications system 1014 (e.g., a modem, a network card (wireless or wired), an infra-red communication device, etc.), and working memory 1018, which may include RAM and ROM devices as described above. In some embodiments, the computer system 1000 may also include a processing acceleration unit 1016, which can include a digital signal processor DSP, a special-purpose processor, and/or the like.

The computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing, storing, transmitting, and retrieving computer-readable information. The communications system 1014 may permit data to be exchanged with the network and/or any other computer described above with respect to the system 1000.

The computer system 1000 may also comprise software elements, shown as being currently located within a working memory 1018, including an operating system 1020 and/or other code 1022, such as an application program (which may be a client application, Web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for distributed deployment, comprising:
   selecting, by a deployment server, a first set of features of an application to be deployed to a first location;
   selecting, by the deployment server, a second set of features of the application to be deployed to a second location, the second set including at least one feature not included in the first set of features;
   generating, by the deployment server, a first archive file for the first set of features and generating a second archive file for the second set of features using deployment information, a deployment template for the application, and at least one feature module file, wherein the first and second archive files collectively make up an entire deployment for the application, wherein the first archive file and the second archive files are generated specifically for a first application server and a second application server, respectively, wherein the first application server and second application server are heterogeneous, wherein generating the first archive file and the second archive file is performed dynamically based on a current load of each of the first application server and the second application server, and wherein the first set of features and the second set of features are determined at least in part based on the current load of the each of the first application server and the second application server;
   deploying, by the deployment server, the first archive to the first server and the second archive to the second server;
   generating, by the deployment server, a plurality of templates to provide base information used with place holders to determine where business logic from the first and second set of features are to be deployed;
   based on the plurality of templates, generating, by the deployment server, customer deployment model information for each of the achieves, wherein the customer deployment model information includes information regarding deployment for applications installed at the first and second application servers;
   generating, at the deployment server, a deployment map of the first and second sets of feature modules, based on the plurality of templates and the customer deployment model; and
   tracking, by the deployment server, locations of the first and second sets of feature modules across the first and second application servers.

2. The method according to claim 1, wherein:
   each of the first and second locations includes one of a server, a servlet, a node, and a server cluster.

3. The method according to claim 1, further comprising:
   providing the first archive file to the first location and deploying the first set of features to the first location; and
   providing the second archive file to the second location and deploying the second set of features to the second location.

4. The method according to claim 1, wherein:
   the second server utilizes deployment information different from the first server.

5. The method according to claim 1, wherein:
   at least one of the archive files is one of an enterprise archive (EAR) file, Java archive (JAR) file, web application archive (WAR) file, or ZIP file.

6. The method according to claim 1, wherein:
   the first server is a Tomcat server.

7. A method for distributed deployment, comprising:
   identifying a deployment for a plurality of servers, wherein the deployment comprises a plurality of feature modules of an application;
   selecting, by a deployment server, a plurality of servers to which to deploy the deployment;
   generating, by the deployment server, an archive file for each server in the plurality of selected servers using deployment information for each server, a deployment template for the application, and at least one feature module file; wherein at least one archive file comprises a subset of the plurality of feature modules in the deployment, wherein the archive files collectively make up an entire deployment for the application, wherein each archive file is generated for a specific server, wherein the first application server and second application server are heterogeneous, wherein generating the first archive file and the second archive file is performed dynamically based on a current load of each of the first application server and the second application server, and wherein the first set of features and the second set of features are determined at least in part based on the current load of the each of the first application server and the second application server;
   deploying, at the deployment server, each archive file to the corresponding server;
   generating, by the deployment server, a plurality of templates to provide base information used with place holders to determine where business logic from the first and second set of features are to be deployed;
   based on the plurality of templates, generating, by the deployment server, customer deployment model information for each of the achieves, wherein the customer deployment model information includes information regarding deployment for applications installed at the first and second application servers;
   generating, at the deployment server, a deployment map of the first and second sets of feature modules, based on the plurality of templates and the customer deployment model; and
   tracking, by the deployment server, locations of the first and second sets of feature modules across the first and second application servers.

8. A system comprising:
   a processor; and
   a memory coupled with and readable by the processor and having stored therein a sequence of instructions which, when executed by the processor, causes the processor to perform a distributed deployment by:
   selecting a first set of features of an application to be deployed to a first location;
   selecting a second set of features of the application to be deployed to a second location, the second set including at least one feature not included in the first set of features;
   generating a first archive file for the first set of features and generating a second archive file for the second set of features using deployment information, a deployment template for the application, and at least one feature module file, wherein the first and second archive files collectively make up an entire deployment for the application, wherein the first archive file and the second archive files are generated specifically for a first application server and a second application server, respectively wherein the first application server and second application server are heterogeneous, wherein generating the first archive file and the second archive file is performed dynamically based on a current load of each of the first application server and the second application server, and wherein the first set of features and the second set of features are determined at least in part based on the current load of the each of the first application server and the second application server;

deploying the first archive to the first server and the second archive to the second server;

generating a plurality of templates to provide base information used with place holders to determine where business logic from the first and second set of features are to be deployed;

based on the plurality of templates, generating customer deployment model information for each of the achieves, wherein the customer deployment model information includes information regarding deployment for applications installed at the first and second application servers;

generating a deployment map of the first and second sets of feature modules, based on the plurality of templates and the customer deployment model; and tracking locations of the first and second sets of feature modules across the first and second application servers.

9. A computer-readable memory having stored therein a sequence of instructions which, when executed by a processor, causes the processor to perform a distributed deployment by:

selecting a first set of features of an application to be deployed to a first location;

selecting a second set of features of the application to be deployed to a second location, the second set including at least one feature not included in the first set of features;

generating a first archive file for the first set of features and generating a second archive file for the second set of features using deployment information, a deployment template for the application, and at least one feature module file, wherein the first and second archive files collectively make up an entire deployment for the application, wherein the first archive file and the second archive files are generated specifically for a first application server and a second application server, respectively wherein the first application server and second application server are heterogeneous, wherein generating the first archive file and the second archive file is performed dynamically based on a current load of each of the first application server and the second application server, and wherein the first set of features and the second set of features are determined at least in part based on the current load of the each of the first application server and the second application server;

deploying the first archive to the first server and the second archive to the second server;

generating a plurality of templates to provide base information used with place holders to determine where business logic from the first and second set of features are to be deployed;

based on the plurality of templates, generating customer deployment model information for each of the achieves, wherein the customer deployment model information includes information regarding deployment for applications installed at the first and second application servers;

generating a deployment map of the first and second sets of feature modules, based on the plurality of templates and the customer deployment model; and tracking locations of the first and second sets of feature modules across the first and second application servers.

* * * * *

UNITED STATES PATENT AND TRADEMARK OFFICE
CERTIFICATE OF CORRECTION

| | | |
|---|---|---|
| PATENT NO. | : 8,176,114 B2 | Page 1 of 1 |
| APPLICATION NO. | : 12/039290 | |
| DATED | : May 8, 2012 | |
| INVENTOR(S) | : Vandanapu | |

It is certified that error appears in the above-identified patent and that said Letters Patent is hereby corrected as shown below:

In column 9, line 45, in Claim 1, delete "achieves," and insert -- archive, --, therefor.

In column 10, line 39, in Claim 7, delete "achieves," and insert -- archive, --, therefor.

In column 11, line 19, in Claim 8, delete "achieves," and insert -- archive, --, therefor.

In column 12, line 26, in Claim 9, delete "achieves," and insert -- archive, --, therefor.

Signed and Sealed this
Thirty-first Day of July, 2012

David J. Kappos
*Director of the United States Patent and Trademark Office*